United States Patent [19]

Dienes et al.

[11] Patent Number: 4,545,830
[45] Date of Patent: Oct. 8, 1985

[54] METHOD OF SEALING PRESSURIZED ELECTRICAL CABLE WHILE UNDER PRESSURE

[75] Inventors: Zoltan B. Dienes, Annandale; Thomas L. Mineur, High Bridge, both of N.J.

[73] Assignee: Thomas & Betts Corporation, Raritan, N.J.

[21] Appl. No.: 419,256

[22] Filed: Sep. 17, 1982

[51] Int. Cl.[4] .................................... H01B 13/06
[52] U.S. Cl. ........................ 156/48; 156/49; 156/56; 174/16 R; 174/25 G; 174/26 G; 403/6; 403/10
[58] Field of Search ............... 156/48, 49, 56; 174/16 R, 17 VA, 25 G, 26 G; 285/DIG. 25; 403/6, 10

[56] References Cited

U.S. PATENT DOCUMENTS

| | | |
|---|---|---|
| 763,191 | 6/1904 | Marvin . |
| 796,781 | 8/1905 | Welsh . |
| 1,991,230 | 2/1935 | Shanklin ........................ 247/3 |
| 2,199,552 | 5/1940 | Watson ........................ 138/99 |
| 2,253,984 | 8/1941 | Shanklin ...................... 173/244 |
| 2,259,129 | 10/1941 | Engster ........................ 174/15 |
| 2,425,851 | 8/1947 | Wyatt ........................ 174/25 G X |
| 2,432,568 | 12/1947 | Gambitta ........................ 174/15 |
| 2,492,507 | 12/1949 | Tipton ........................ 138/99 |
| 2,655,946 | 10/1953 | Morris ........................ 138/99 |
| 2,967,795 | 1/1961 | Bollmeier et al. .............. 156/56 X |
| 3,188,121 | 6/1965 | Cude et al. ..................... 285/197 |
| 3,578,896 | 5/1971 | Lynch ........................ 156/49 X |
| 3,823,250 | 7/1974 | De Monsy et al. .............. 156/48 X |

*Primary Examiner*—Robert A. Dawson
*Attorney, Agent, or Firm*—Robert M. Rodrick; Salvatore J. Abbruzzese

[57] ABSTRACT

Gas pressurized electrical cables, having a portion of an outer sheath removed for repair or splicing, are sealed while under pressure by providing at the exposed cable portion a gas pressure escape vent having a vent opening of area less than that of the cable exposed portion. Sealant tape is wrapped around the exposed cable portion and the vent exterior effectively sealing the entire exposed cable portion with the exception of the vent opening through which the gas escapes while such sealant tape is applied. The vent opening, being smaller than the original exposed cable portion, is readily sealably closed as by suitably plugging such vent opening and covering same with a sealant material.

18 Claims, 6 Drawing Figures

METHOD OF SEALING PRESSURIZED ELECTRICAL CABLE WHILE UNDER PRESSURE

FIELD OF THE INVENTION

This invention relates generally to sealing techniques of electrical cables and specifically to a method of sealing a gas-pressurized electrical cable while under pressure.

BACKGROUND OF THE INVENTION

Multiple conductor electrical cables, such as telephone cables, typically include bundles of insulated wire conductors contained within a weather resistant outer sheath of lead, plastic or other protective materials. These cables are often buried under ground or mounted on supports above ground. To minimize deleterious electrical effects of insidious moisture leaks, it is now common practice to maintain a positive gas pressure, such as by air or nitrogen, to prevent inward leaks of moisture. While such gas pressurization is desirable in controlling moisture, problems arise in maintenance, repair and in making splices or connections of other cables thereto. In making a repair, for example, of a damaged outer sheath, or in splicing, it is often necessary to remove a portion of the sheath, exposing thereby the interiorly contained conductors. Upon sealing such exposed cables, it is then necessary, using currently available techniques, to totally depressurize the cable to effectively apply sealant products. Without such depressurization, the gas escaping from the exposed cable causes air pockets and bubbles in the sealant products, effectively preventing the achievement of a reliable cable sheath seal. Accordingly, to enable proper sealing, known current practices require the gas pressure to be turned off. Such depressurization and then repressurization can typically take several hours resulting in not only wasted time and additional costs, but also in an increase in the potential for moisture leaks during the depressurization period.

SUMMARY OF THE INVENTION

It is therefore an object of the present invention to provide an improved method of sealing an exposed portion of gas pressurized electrical cables while under pressure.

In accordance with the method of the present invention, an exposed area of a gas pressurized electrical cable is sealed by sealably covering a portion of the exposed area to define a venting area that is less than that of the exposed cable area. As the cable is under pressure, the gas escapes through the venting area while all of the exposed cable area is sealed except such venting area. Then, the venting area is sealably closed.

In the preferred manner, a hollow tubular member defining the gas pressure escape vent is provided at the exposed cable portion. The tubular member hollow interior defines a gas-flow opening that is less in size than the exposed cable portion. The exposed cable portion and the vent exterior are then sealably covered such that the gas may escape through the escape vent opening. The vent opening is then sealably closed to effect the complete seal. A protective sleeve may then be applied over the sealed cable portion.

DETAILED DESCRIPTION OF THE PREFERRED EMBODIMENT

Figure 1:
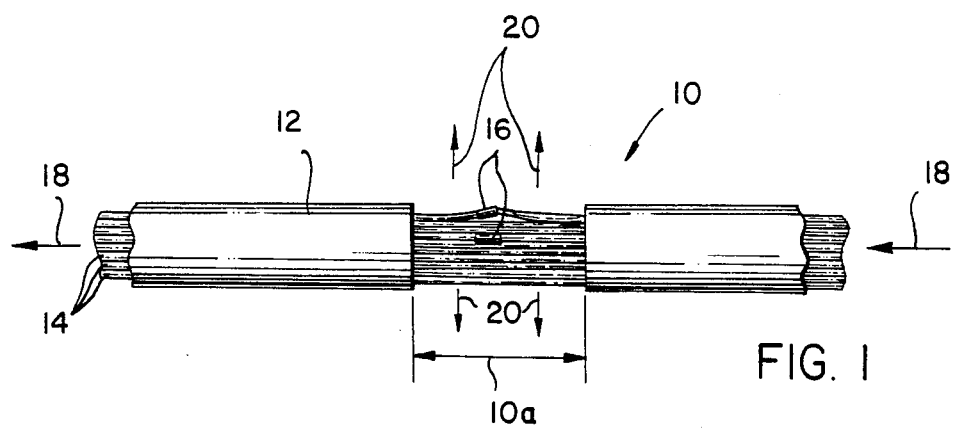
FIG. 1 is a side elevation view of a gas pressurized multiconductor sheathed electrical cable showing a portion of the outer sheath removed for repair or splicing purposes.

Referring now to the drawing, there is shown in FIG. 1 a gas pressurized electrical cable 10, such as a telephone cable, comprising an outer sheath 12 of lead, plastic or other suitable material and containing a plurality of individually insulated conductors 14. The invention may also be practiced with single conductor cable having suitable gas channel means. As shown, a portion of the sheath 12 has been removed, thereby exposing the conductors 14, the exposed cable area being identified generally by numeral 10a between the spaced, severed sheath sections. Removal of the sheath portion is typically required in repair of damaged telephone cables or in making splices or other electrical connections as indicated by connectors 16. It is not uncommon for the length of the removed sheath (i.e., 10a) to be on the order of eight (8) inches and may be as much as several feet.

The cable 10 is of the type which, while part of a system, is maintained for moisture control under positive gas pressure, such as air or nitrogen, and typically at a pressure of about 10-12 pounds per square inch. The gas flow within the cable is indicated by the arrows 18, while the gas escaping from the cable exposed area 10a, due to the removal of the cable sheath portion, is indicated by arrows 20. In accordance with the invention, the cable exposed portion 10a is repaired or otherwise sealed while the cable is maintained under pressure, the method of sealing being fully described with reference to FIGS. 2-6 of the drawing.

Figure 2:
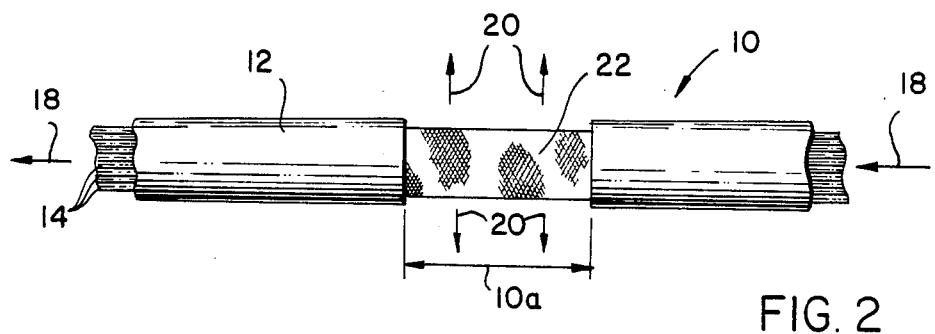
FIG. 2 is a view of the cable of FIG. 1 showing a gas permeable material covering the exposed interior conductors.
Figure 3:
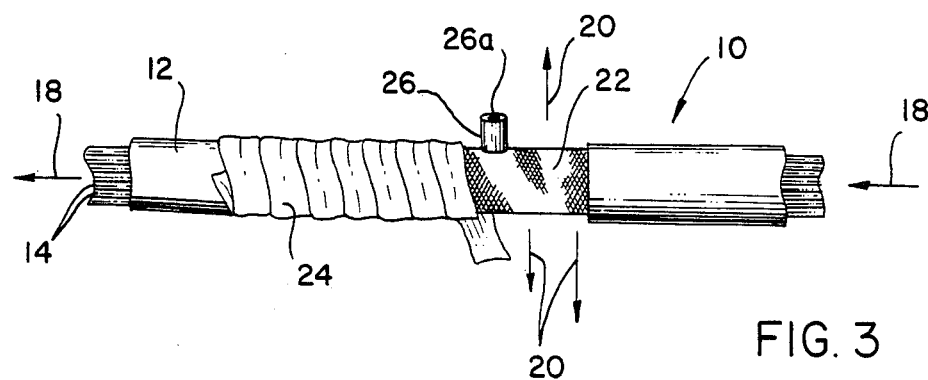
FIG. 3 is a view of the cable of FIG. 2 showing a preliminary stage of the cable sealing method of the present invention in accordance with the preferred technique.

Referring to FIG. 2, the exposed cable portions 10a may be covered with a gas permeable material 22, such as muslin tape, or other suitable material to protect the conductors 14 and the connection area. As such, the gas 20 passes through the muslin tape 22 applied thereover. Referring now to FIG. 3, a sealant material 24, in the form of a tape 24, is wrapped helically, in half-overlapping fashion, onto the sheath 12 and onto the muslin tape 22 over the exposed cable portion. In the preferred form, the sealant material comprises two different materials including a sealant tape of butyl rubber and an adhesively coated pressure tape of polyester film. The butyl rubber tape is applied initially with the polyester pressure tape wrapped thereover. It should be appreciated that other sealant materials may be used in the practice of the invention and that one or more layers of such materials may be applied.

Figure 4:
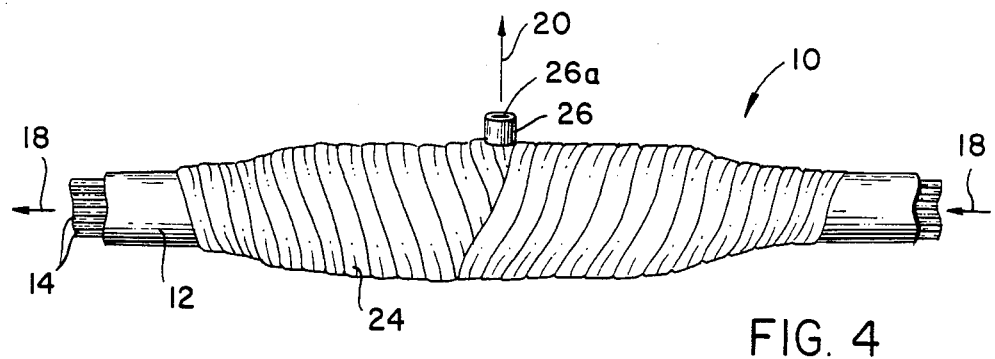
FIG. 4 is a view of the cable of FIG. 3 showing an intermediate stage of the cable sealing method.

Still referring to FIG. 3, at the location at which the escaping gas 20 appears to be the greatest, a gas pressure escape vent 26 is placed onto the muslin tape 22. The vent 26 is preferably in the form of a hollow tubular member having an opening 26a that is substantially less than the exposed cable portion 10a through which the gas 20 escapes from the cable during repair or splicing. The vent 26, preferably formed of a plastic or rubber material, is placed on the muslin tape 22 such that the gas flow opening 26a is approximately transverse to the longitudinal axis of the cable 10. Wrapping of the sealant material 24 is then continued until the entire cable exposed portion is sealed as shown in FIG. 4, the sealant material 24 being wrapped around the vent 26 to seal the exterior wall thereof. As the vent 26 permits the gas 20 to escape, the entire exposed cable area 10a, with the exception of the vent opening 26a, is effectively sealed while the cable is under pressure, the gas 20 escaping through the vent opening 26a.

Figure 5:
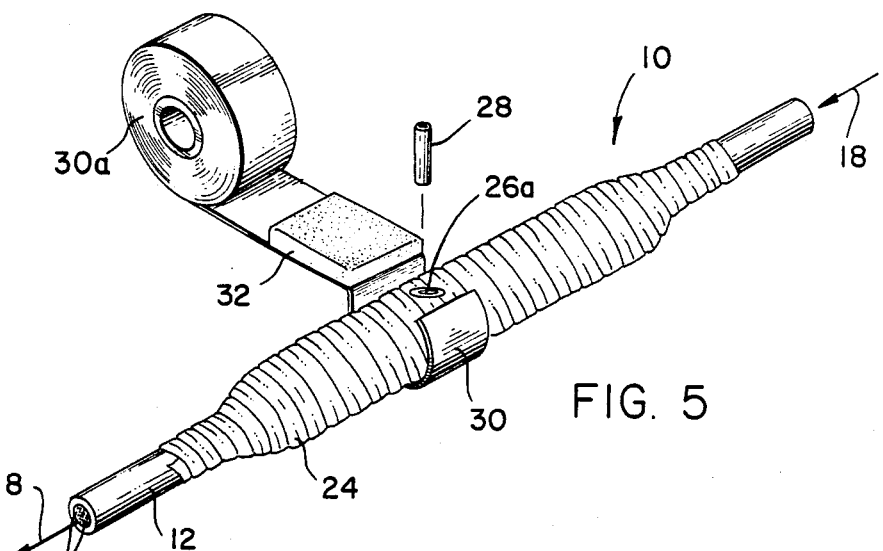
FIG. 5 is a perspective view of the cable of FIG. 4 showing a technique of sealably plugging a gas pressure escape vent in accordance with one embodiment of the invention.
Figure 5:
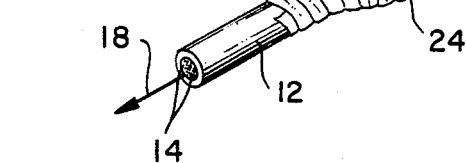
Figure 6:
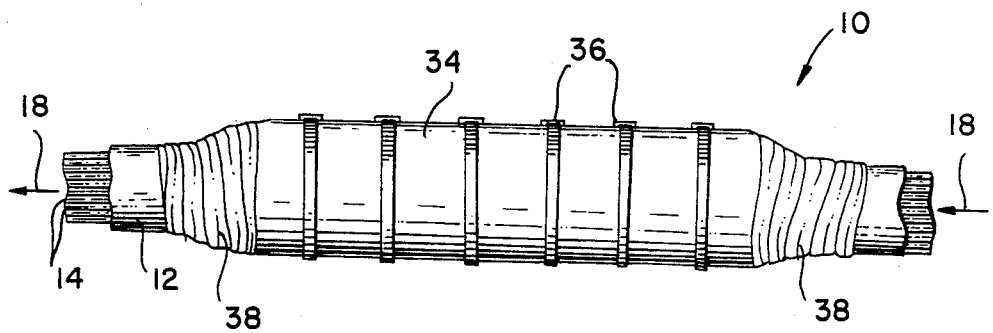
FIG. 6 is a side elevation view of a completely sealed cable showing a protective sleeve thereover.

As the remaining unsealed portion of the cable is now only the relatively small vent opening 26a (which may be on the order of one half inch in diameter), complete sealing may be readily accomplished as shown in FIG. 5. The projecting portion of the vent 26 is removed such that the vent upper surface is substantially flush with the outer surface of the sealant tape 24. A cylindrically shaped plug 28, preferably of butyl rubber, is formed for interfering insertion into the vent opening 26a. A film of adhesive pressure tape 30 of polyester or other suitable material is wrapped nearly fully around the sealant tape 24 without yet covering the vent opening 26a, and not severed from the roll 30a. A sealant pad 32 of butyl rubber is adhered to the adhesive side of the tape 30 such that when wrapping is resumed the pad 32 will cover the vent opening 26a. The plug 28 is then forcibly inserted into the vent opening 26a and the tape 30 with the sealant pad 32 thereon is quickly wrapped over the plugged vent opening 26, the tape being wrapped several times therearound in half-overlapped fashion to complete the cable seal. The tape 30 is then severed from the roll 30a.

Subsequent to sealing, the cable 10 may be covered by a flexible, protective sleeve 34 which may be a longitudinally split sleeve that is compressively retained on the sealed cable as by fastening straps 36 of the self-locking type, the ends of the sleeve 34 being secured to the cable sheath 12 as by layers of tape 38. The sleeve 34 may be of the type as shown in commonly assigned U.S. Pat. No. 4,358,634 entitled "Protective Cover for Use in Sealed Cable Splices" and issued on Nov. 9, 1982.

Having described the preferred embodiment of the invention, the advantages of the present sealing method should be appreciated. The primary advantage is the time and cost saved as a result of the seal being effected while the cable is under pressure. In addition, however, the tooling required to complete the sealing is minimal. Moreover, the sealed cable, even with the protective sleeve thereon, remains flexible and can be reopened and resealed if necessary. Furthermore, the seal may be installed within a range of temperatures inasmuch as the sealing requirements are not temperature dependent. Also, in use, the pressure seal as provided herein will be maintained within a wide range of temperatures.

It should also be appreciated that other variations and modifications of the invention may be made without departing from the contemplated scope thereof. For example, a valve may be used in place of the tubular escape vent 26, which valve may be sealably closed to complete the seal. Moreover, instead of either a vent 26 or valve, the exposed cable area through which the gas escapes may be reduced by covering the exposed area with a suitable sealant material except for a vent opening that is less than the area of the exposed portion. This material may be sealed such that all the exposed cable portion is sealed with the exception of the vent opening. This vent opening may then be covered and sealed as set forth hereinabove. The particularly disclosed and depicted embodiments of the invention and methods are thus intended in an illustrative rather than limiting sense. The true scope of the invention is set forth in the following claims.

We claim:

1. A method of sealing an exposed area of a gas pressurized electrical cable while under pressure, comprising the steps of:
    (a) sealably covering, while maintaining a positive gas pressure in said cable, a portion of said exposed area defining thereby a pressure venting area less than that of said exposed area whereby gas may escape therethrough; and then
    (b) sealably closing said pressure venting area.

2. A method according to claim 1, wherein said exposed area is sealably covered by placing a first material over said exposed area to thereby reduce such exposed area and define said venting area and then sealing said first material with a second material.

3. A method according to claim 1, wherein said exposed area is sealably covered by placing a sealant material over said exposed portion except at said venting area.

4. A method according to claim 1, wherein said pressure venting area is sealably closed by placing a plug in said venting area.

5. A method according to claim 4, wherein subsequent to placing said plug, sealant material is applied thereover.

6. A method of sealing an exposed portion of a gas pressurized electrical cable while under pressure, comprising the steps of:
    (a) providing at said cable exposed portion a gas pressure escape vent having a gas-flow opening of size less than that of said exposed portion;
    (b) sealably covering, while maintaining a positive gas pressure in said cable, said exposed portion except said escape vent whereby gas may escape through said vent; and then
    (c) sealably closing said pressure escape vent opening.

7. A method according to claim 6, wherein said exposed portion is sealably covered in step (b) by applying a layer of sealant material thereabout.

8. A method according to claim 7, wherein said pressure vent opening is defined by an opening in said sealant material.

9. A method according to claim 7, wherein said pressure vent is defined by a generally hollow member sealably supported by said sealant material, the hollow interior defining said gas-flow opening.

10. A method according to claim 9, wherein said sealant material is in the form of a tape applied to said cable by wrapping about said exposed portion and around said hollow member.

11. A method according to claim 10, wherein said tape comprises layers of different materials.

12. A method according to claim 6, wherein said pressure escape vent is sealably closed by plugging said opening and applying sealant material thereover.

13. A method according to claim 6, further including the step of placing a protective flexible sleeve over said sealed exposed cable portion.

14. A method of sealing an exposed sheath portion of a sheathed multiconductor, gas pressurized, electrical cable, comprising the steps of:
  (a) providing at said exposed sheath portion a gas pressure escape vent having a gas-flow opening in size less than that of said exposed sheath portion;
  (b) applying, while maintaining a positive gas pressure in said cable, a sealant material onto said sheath, over said exposed sheath portion and to said vent except at said opening to thereby seal said exposed sheath portion and permit gas to escape through said vent opening; and then
  (c) sealably covering said vent opening.

15. A method according to claim 14, wherein said pressure escape vent is defined by a hollow, generally tubular member.

16. A method according to claim 15, wherein said sealant material is a tape applied by wrapping onto said sheath, over said exposed sheath portion and sealably around said tubular member.

17. A method according to claim 16, wherein said hollow tubular member is sealably covered by applying sealant material thereover.

18. A method according to claim 14, further including the step of covering said sealed exposed sheath portion with a flexible protective sleeve.

* * * * *

REEXAMINATION CERTIFICATE (1112th)
United States Patent [19]
Dienes et al.

[11] B1 4,545,830
[45] Certificate Issued  Aug. 1, 1989

[54] METHOD OF SEALING PRESSURIZED ELECTRICAL CABLE WHILE UNDER PRESSURE

[75] Inventors: Zoltan B. Dienes, Annandale; Thomas L. Mineur, High Bridge, both of N.J.

[73] Assignee: Thomas & Betts Corporation, Raritan, N.J.

Reexamination Request:
No. 90/001,497, Apr. 18, 1988

Reexamination Certificate for:
Patent No.: 4,545,830
Issued: Oct. 8, 1985
Appl. No.: 419,256
Filed: Sep. 17, 1982

[51] Int. Cl.⁴ .............................. H01B 13/06
[52] U.S. Cl. ........................ 156/48; 156/49; 156/56; 174/16 R; 174/25 G; 174/26 G; 403/6; 403/10
[58] Field of Search ............... 156/48, 49, 56, 94; 174/16 R, 17 VA, 25 G, 26 G; 285/15, DIG. 25; 403/6, 10

[56] References Cited
U.S. PATENT DOCUMENTS

| | | |
|---|---|---|
| Re. 17,166 | 12/1928 | De La Mare . |
| 1,587,701 | 6/1926 | De La Mare . |
| 1,662,852 | 3/1928 | De La Mare . |
| 1,737,650 | 12/1929 | Emanueli . |
| 1,838,686 | 12/1931 | De La Mare . |
| 2,168,757 | 8/1939 | Baillard et al. ............ 174/23 |
| 3,290,194 | 11/1966 | Gillemot .................. 156/48 |
| 3,563,276 | 2/1971 | Hight et al. .............. 138/99 |
| 3,564,119 | 2/1971 | Thompson ............... 174/135 |
| 3,671,622 | 6/1972 | Humphries .............. 264/263 |
| 4,053,176 | 10/1977 | Hilbush .................... 285/15 |
| 4,326,735 | 4/1982 | Hunder et al. ............ 285/15 |
| 4,357,961 | 11/1982 | Chick ....................... 138/97 |

FOREIGN PATENT DOCUMENTS

| | | |
|---|---|---|
| 624433 | 7/1961 | Canada . |
| 1166335 | 10/1969 | United Kingdom . |
| 1598433 | 9/1981 | United Kingdom . |

*Primary Examiner*—Robert A. Dawson
*Attorney, Agent, or Firm*—Robert M. Rodrick; Salvatore J. Abbruzzese

[57] ABSTRACT

Gas pressurized electrical cables, having a portion of an outer sheath removed for repair or splicing, are sealed while under pressure by providing at the exposed cable portion a gas pressure escape vent having a vent opening of area less than that of the cable exposed portion. Sealant tape is wrapped around the exposed cable portion and the vent exterior effectively sealing the entire exposed cable portion with the exception of the vent opening through which the gas escapes while such sealant tape is applied. The vent opening, being smaller than the original exposed cable portion, is readily sealably closed as by suitably plugging such vent opening and covering same with a sealant material.

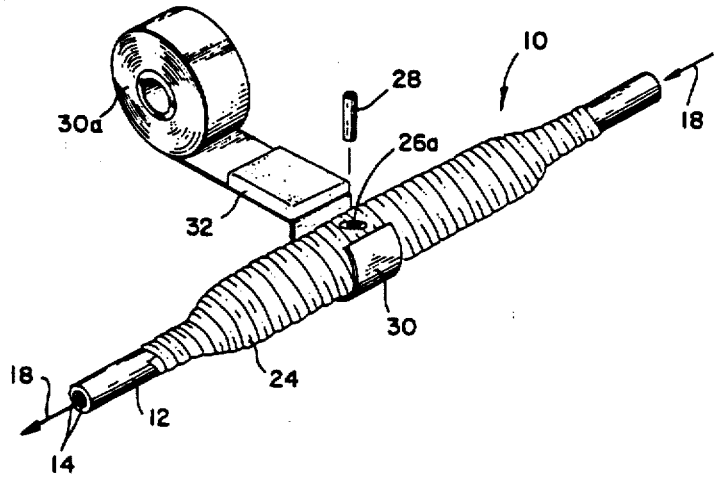

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4, 6 and 14–18 are cancelled.

Claims 2, 3, 5, 7, 12 and 13 are determined to be patentable as amended.

Claims 8–11, dependent on an amended claim, are determined to be patentable.

New claims 19–27 are added and determined to be patentable.

2. A method according to claim [1] *5*, wherein said exposed area is sealably covered by placing a first material over said exposed area to thereby reduce such exposed area and define said venting area and then sealing said first material with a second material.

3. A method according to claim [1] *5*, wherein said exposed area is sealably covered by placing a sealant material over said exposed portion except at said venting area.

5. A method *of sealing an exposed area of a gas pressurized electrical cable while under pressure, comprising the steps of:*
   (a) *sealably covering, while maintaining a positive gas pressure in said cable, a portion of said exposed area defining thereby a pressure venting area less than that of said exposed area whereby gas may escape therethrough;*
   (b) *sealably closing said pressure venting area by placing a plug in said venting area; and* [according to claim 4, wherein] *subsequent to placing said plug,*
   (c) *applying* sealant material [is applied thereover] *over said plug.*

7. A method according to claim [6] *12*, wherein said exposed portion is sealably covered in step (b) by applying a layer of sealant material thereabout.

12. A method *of sealing an exposed portion of a gas pressurized electrical cable while under pressure, comprising the steps of:*
   (a) *providing at said cable exposed portion a gas pressure escape vent having a gas-flow opening of size less than that of said exposed portion;*
   (b) sealably covering, while maintaining a positive gas pressure in said cable, said exposed portion except said escape vent whereby gas may escape through said vent; and then
   (c) sealably closing said pressure escape vent opening [according to claim 6, wherein said pressure escape vent is sealably closed] by plugging said opening and applying sealant material thereover.

13. A method according to claim [6] *12*, further including the step of placing a protective flexible sleeve over said sealed exposed cable portion.

19. *A method of sealing an exposed area of a gas pressurized, sheathed electrical cable while under pressure, comprising the steps of:*
   (a) *applying a gas permeable layer over said exposed area;*
   (b) *sealably covering, while maintaining a positive gas pressure in said cable, a portion of said gas permeable layer with a sealant material and defining thereby a pressure venting area less than that of said exposed area, whereby gas may escape through said gas permeable layer and through said venting area;*
   (c) *sealably closing said pressure venting area;*
   (d) *applying a sealant pad over said closed venting area; and then*
   (e) *covering said sealant pad with sealant tape.*

20. *A method according to claim 19, wherein said pressure venting area is closed by placing a plug sealably in said venting area.*

21. *A method according to claim 20, wherein said step of sealably covering a portion of said gas permeable member is practiced by applying a first layer of sealant tape onto a portion of said gas permeable member and onto opposed extents of cable sheath adjacent said exposed area and then by covering said first layer of sealant tape with a second layer of sealant tape.*

22. *A method according to claim 21, wherein said sealant pad is formed of a material substantially the same as the material of the first layer of sealant tape.*

23. *A method according to claim 21, wherein said second layer of sealant tape is applied from a roll of such tape, and wherein said sealant pad is applied over said plugged venting area before the second layer of tape is severed from said roll, and wherein the sealant pad is then covered by the second layer of sealant tape from such roll.*

24. *A method according to claim 23, wherein said sealant pad is adhered to said second layer of tape before said pad is applied to said plugged venting area, said pad being applied to said plugged venting area by wrapping said second layer of tape thereover.*

25. *A method according to claim 20, wherein said plug is formed of a rubber-type material of size to be force-fitted into said venting area.*

26. *A method according to claim 20 wherein said venting area is defined by a generally hollow member sealably supported by said sealant material, the hollow interior defining a gas-flow opening.*

27. *A method according to claim 26, wherein said generally hollow member is placed onto said gas permeable layer such that gas may escape through said gas-flow opening.*

* * * * *